United States Patent [19]

Schick et al.

[11] Patent Number: 5,515,669

[45] Date of Patent: May 14, 1996

[54] ANTI-BUCK DEVICE FOR OUT-FRONT MOWER TRACTORS

[75] Inventors: Scott Schick, Corydon; Donald H. Parkes, Lamoni, both of Iowa

[73] Assignee: The Shivvers Group, Inc., Corydon, Iowa

[21] Appl. No.: 382,895

[22] Filed: Feb. 3, 1995

[51] Int. Cl.6 ............................................. A01D 34/64
[52] U.S. Cl. .............. 56/15.7; 56/DIG. 10; 56/DIG. 11; 56/DIG. 14; 280/32.7
[58] Field of Search ............................ 56/15.7, 15.8, 56/12.6, 16.7, DIG. 3, DIG. 9, DIG. 10, DIG. 11, DIG. 14, DIG. 1; 180/215; 280/460.1, 32.7

[56] References Cited

U.S. PATENT DOCUMENTS

| | | | |
|---|---|---|---|
| 3,908,345 | 9/1975 | Oni et al. | 56/208 |
| 4,325,468 | 4/1982 | Siorek | 188/282 |
| 4,413,692 | 11/1983 | Clifft | 280/204 X |
| 4,474,271 | 10/1984 | Mölders et al. | 188/280 |
| 4,495,754 | 1/1985 | Cartner | 56/11.9 |
| 4,624,346 | 11/1986 | Katz | 188/282 |
| 4,760,686 | 8/1988 | Samejima et al. | 56/15.8 |
| 4,821,852 | 4/1989 | Yokoya | 188/322.15 |
| 4,832,318 | 5/1989 | Wang | 267/120 |
| 4,874,066 | 10/1989 | Silberstein | 188/280 |
| 4,876,845 | 10/1989 | Sturgill | 56/15.7 X |
| 4,895,229 | 1/1990 | Kato | 188/282 |
| 4,896,489 | 1/1990 | Wykhuis | 56/15.9 |
| 4,899,525 | 2/1990 | Takei et al. | 56/202 |
| 4,905,799 | 3/1990 | Yamaoka et al. | 188/322.15 |
| 4,919,215 | 4/1990 | Lee et al. | 172/450 |
| 4,920,732 | 5/1990 | Lee et al. | 56/10.2 |
| 4,926,621 | 5/1990 | Torras | 56/15.8 X |
| 4,998,948 | 3/1991 | Osterling | 56/12.6 |
| 5,058,715 | 10/1991 | Silberstein | 188/280 |
| 5,106,065 | 4/1992 | Staton et al. | 267/64.11 |
| 5,161,353 | 11/1992 | Bergkamp et al. | 56/6 |
| 5,316,113 | 5/1994 | Yamaoka | 188/282 |

*Primary Examiner*—Terry Lee Melius
*Attorney, Agent, or Firm*—Wallenstein & Wagner, Ltd.

[57] ABSTRACT

The present invention provides an anti-buck vehicle comprising an engine chassis, an implement pivotally connected to a front end of the engine chassis, and an anti-buck device connecting the engine chassis to the implement to prevent sudden pivotal movement of the engine chassis toward the implement.

16 Claims, 1 Drawing Sheet

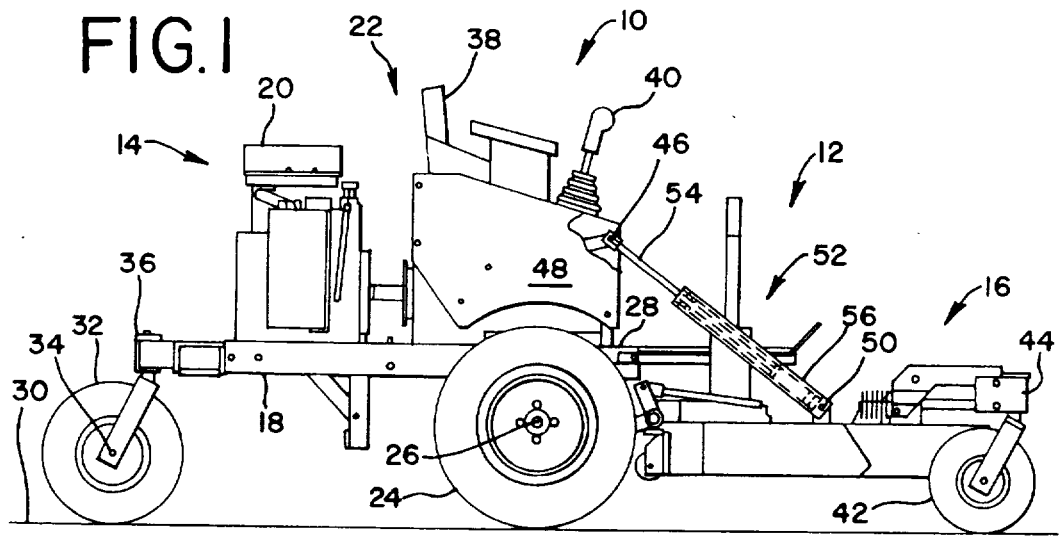
FIG. 1
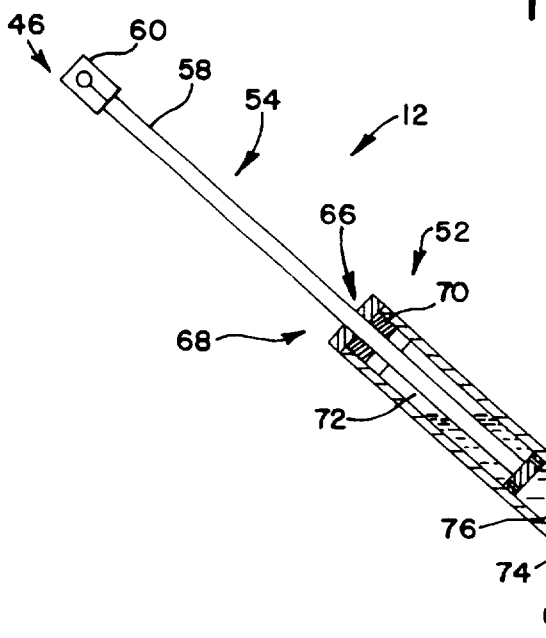
FIG. 2
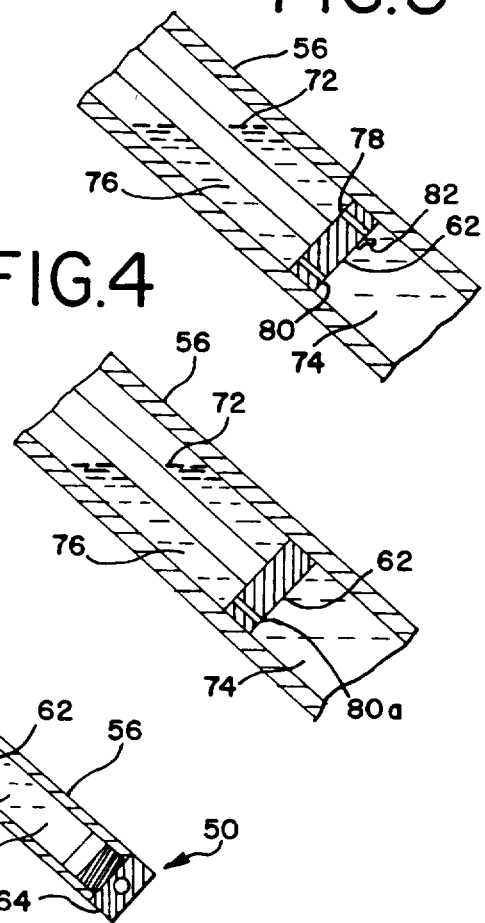
FIG. 3
FIG. 4

5,515,669

ANTI-BUCK DEVICE FOR OUT-FRONT MOWER TRACTORS

FIELD OF THE INVENTION

This invention generally relates to improved tractor vehicles, for example, out-front mower tractors. More specifically, this invention relates to improved out-front mower tractors having an anti-buck tractor device that prevents the rear chassis of the tractor from bucking up and toward the front deck of the tractor.

BACKGROUND OF THE INVENTION

A tractor is a common off-road and on-road motorized vehicle used to operate an implement. The implement may perform the function of mowing, plowing, or lifting, for example. An out-front mower tractor is one type of tractor having an implement.

An out-front mower tractor is used to efficiently cut a relatively large amount of grass and other ground cover growth. An out-front mower tractor typically includes a motorized tractor having ground engaging wheels and a mower implement attached to the tractor. An out-front mower tractor has the mower implement positioned in front of the tractor; thus, when the tractor is moving in a forward direction, the tractor pushes the mower implement. Conversely, when the tractor is moving in a reverse direction, the tractor pulls the mower implement.

Existing out-front mower tractors have exhibited problems. For example, out-front mower tractors have a tendency for the back end of the tractor chassis to "rear up" or buck when put in reverse. In particular, the rear end of the tractor rises up off the ground, pivots about the front drive wheels towards the implement, and then returns to the ground by pivoting away from the implement. The time duration of a buck is relatively short; however, the force of the rear end rising above the ground is significant.

The bucking tractor can be dangerous to the operator who is seated on the tractor. If the bucking is sufficiently severe, the operator may even be ejected from the operator's seat.

Existing out-front mower tractors have compensated for bucking by adding weights to the tractor behind the drive wheels. The further away the weights are from the drive wheels the more effective the weights are at preventing bucking. This additional weight causes the tractor to have poor traction because tractor weight is shifted off of the drive wheels and onto non-drive rear wheels which are mounted to the tractor behind the drive wheels. Traction may be particularly poor when operating the out-front mower tractor on a hillside, for example as the extra weights have a tendency to cause the tractor to steer downhill.

Others have tried to overcome this problem of buck-compensating weights by adding heavy springs to support the rear chassis of the tractor. The heavy springs transfer weight from the out front implement back to the drive wheels for improved traction. However, this also counterbalances some of the weight on the rear wheels which negates the effect of some of the buck-compensating weights. Therefore, a need exists to improve tractor vehicles and particularly out-front mower tractors.

The present invention satisfies this and other needs to improve tractor vehicles. The present invention satisfies these needs by providing an anti-buck device between the tractor and the mower implement. The anti-buck device reduces or prevents the rear end of the tractor from bucking up and forward. The anti-buck device also allows the front end of the mower implement to freely move upward away from the ground terrain and freely move downward toward the ground terrain. Accordingly, the present invention decreases the weight of tractor vehicles, eliminates the counterbalance forces, improves traction, and increases performance of the machine. The increased performance and decreased cost due to simplification provides a very desirable and cost competitive machine.

Other aspects and advantages of the present invention will become apparent after reading this disclosure, including the claims, and reviewing the accompanying drawings.

SUMMARY OF THE INVENTION

The present invention provides an anti-buck vehicle comprising an engine chassis having a front end and a rear end and an implement pivotally connected to the front end. The anti-buck vehicle further comprises means connected to the engine chassis and to the implement for resisting pivotal movement of the rear end of the engine chassis toward the implement. The means for resisting movement allows the implement to freely pivot in a direction away from the engine chassis.

The means for resisting pivotal movement comprises a cylinder that meters the flow of hydraulic fluid through the cylinder to control the pivotal movement of the tractor above the drive wheel. The cylinder includes a piston having a piston head and a piston rod. The piston rod is slidable into and out of the cylinder through an opening in the cylinder. The piston head is connected to the piston rod and is slidably positioned within the cylinder. The piston head separates the cylinder into a first chamber and a second chamber such that the fluid contained within the cylinder flows through the piston head and between the first and second chambers as the piston head slides within the cylinder.

The piston head has a passageway that controls or meters the flow of fluid between the first and second cylinder chambers. It is also possible for the piston head to include more than one passageway, such as two passageways. In the two passageway embodiment, first and second passageways are provided from the first chamber to the second chamber. The first passageway permits oil flow from the first chamber to the second chamber and prevents oil flow from the second chamber to the first chamber. The second passageway permits restricted oil flow between the first and second chambers.

BRIEF DESCRIPTION OF THE DRAWINGS

FIG. 1 is a side elevational view of an out-front mower tractor having an anti-buck device made in accordance with the principles of the present invention.

FIG. 2 is a cross-sectional view of an anti-buck device made in accordance with the principles of the present invention.

FIG. 3 is an enlarged view of a portion of FIG. 2 showing a piston head of an anti-buck device.

FIG. 4 is an enlarged view of a piston head of the present invention having a single passageway to meter the flow of fluid.

DETAILED DESCRIPTION OF THE INVENTION

Although the present invention can be made in many different forms, the preferred embodiments are described in this disclosure and shown in the attached drawings. This disclosure exemplifies the principles of the present invention and does not limit the broad aspects of the invention only to the illustrated embodiments.

FIG. 1 shows a side elevational view of an out-front mower tractor 10 having an anti-buck device 12 made in accordance with the principles of the present invention. The out-front mower tractor 10 includes a tractor 14 and a mower implement 16 rotatably connected to the tractor 14. The tractor includes an engine chassis 18 having an engine 20 and an operator's cab 22 mounted on the engine chassis 18. Two opposed main drive wheels 24 are mounted on two drive axles 26 at a front end 28 of the engine chassis 18. (Only one drive wheel 24 and one drive axle 26 are shown). The drive axles 26 and drive wheels 24 are coaxially aligned and support the front end 28 of the engine chassis 18 on a ground surface 30. The engine chassis 18 is also pivotable about the front axles 26 of the front drive wheels 24. The main drive wheels 24 rotate under power, as described below, to drive the out-front mower tractor 10 in forward, reverse, and turning directions. The drive wheels 24 maintain traction or frictional contact with the ground surface 30 for effective operation of the vehicle 10.

Two opposed rear casters 32 are mounted on two rear axles 34 at a rear end 36 of the engine chassis 18. (Only one rear caster 32 and one rear axle 34 are shown). Of course it would be possible to have one caster or numerous casters to support the engine chassis 18. The rear axles 34 and rear casters 32 are coaxially aligned and support the rear end 36 of the engine chassis 18 on the ground surface 30. The rear casters 32 rotate freely, but do not drive the out-front mower tractor 10.

Through appropriate hydraulic components, the engine 20 provides motive power to two hydrostatic transmissions (not shown). Each hydrostatic transmission is independently controlled and drives only one drive wheel 24. Accordingly, each hydrostatic transmission drives each drive wheel 24 independently from the other drive wheel 24. An operator controls both the speed and the direction of the out-front mower tractor 10 by independently controlling the speed and direction of each hydrostatic transmission and its corresponding drive wheel 24. For example, when the operator drives both drives wheels 24 forward the out-front mower tractor 10 will move to the right as shown in FIG. 1. Of course, if the out-front mower tractor 10 is moving in reverse, the out-front mower tractor 10 will move to the left as shown in FIG. 1. When the operator drives the left drive wheel 24 faster than the right drive wheel 24 in the forward direction, the out-front mower tractor 10 will turn to the right. A mechanical transmission can be utilized instead of a hydrostatic transmission.

The operator's cab 22 is mounted on the engine chassis 18 above the main drive wheels 24 and includes an operator's seat 38 and a joystick 40. Of course, more than one joystick 40 may be provided, for example, twin joysticks. As is more completely set forth in the commonly assigned U.S. Pat. No. 5,279,376, which is incorporated herein by reference, the operator uses the joystick 40, which is linked to appropriate vehicle controls, to control the hydrostatic transmissions and thus, the speed and direction of the out-front mower tractor 10. The engine chassis 18 extends rearward of the operator's cab 22 and may also extend forward of the operator's cab 22. The mower implement or cutting deck 16 is mounted on the front end 28 of the engine chassis 18 and extends forward of the operator's cab 22. The cutting deck 16 is supported by and pivotable about the front axles 26 of the main drive wheels 24. A pair of opposed cutting deck casters 42 located at a front end 44 on the cutting deck 16 also support the cutting deck 16 on the ground surface 30. The cutting deck casters 42 rotate freely and do not drive the out-front mower 10 tractor. Of course one may use one caster 42 or numerous casters on the cutting deck 16. The cutting deck 16 is a mower used to efficiently cut a relatively large amount of grass and other ground cover growth.

The out-front mower tractor 10 of the present invention includes an anti-buck device 12. The anti-buck device 12 prevents the rear 36 of the tractor 14 from bucking up and forward when the out-front mower tractor 10 is driven reverse. Bucking is particularly a problem when the out-front mower tractor 10 is suddenly put into reverse. The anti-buck device 12 permits the front mounted cutting deck 16 to move downward without restriction. The anti-buck device 12 also permits slow movements of the cutting deck 16 upward with little or no restriction to the upward motion. Accordingly, the anti-buck device 12 resists pivotal movement of the engine chassis 18 and the cutting deck 16 toward each other during bucking.

The anti-buck device 12 is shown generally in FIG. 1. Preferably, there is one anti-buck device 12 on the left side of the vehicle; however, it is possible to mount the anti-buck device on the right side or to include two anti-buck devices.

The anti-buck device 12 is mounted to the engine chassis 18 and to the cutting deck 16. More specifically, a first end 46 of the anti-buck device 12 is mounted on the engine chassis 18 near the front end 28 of the engine chassis 18. The first end 46 of the anti-buck device 12 may be mounted to a structural member 48, such as an operator's cab frame, that is mounted to the engine chassis 18. A second end 50 of the anti-buck device 12 is mounted on the cutting deck 16.

Preferably, the anti-buck device 12 is a self-contained hydraulic cylinder assembly 52. Such a self-contained hydraulic cylinder assembly 52 contains hydraulic oil 76 completely within the assembly 52. Each hydraulic cylinder assembly 52 includes a piston 54 mounted to the engine chassis 18 and a cylinder 56 mounted to the cutting deck 16. Alternatively, the hydraulic cylinder assembly 52 could be mounted in reverse such that the piston 54 is mounted to the cutting deck 16 and the cylinder 56 is mounted to the engine chassis 18.

FIG. 2 shows a cross-sectional view of an anti-buck device 12 made in accordance with the principles of the present invention. The anti-buck device 12 of FIG. 2 is a hydraulic cylinder assembly 52 having a piston 54 and a cylinder 56. The piston 54 includes an elongated piston rod 58 having a mounting bracket 60 at one end 46. The other end of the piston rod is connected to a piston head 62. The cylinder 56 has a mounting bracket 64 at one end 50 and an opening 66 at an opposite end 68. As shown in FIG. 2, the piston head 62 is disposed within the cylinder 56 and the piston rod 58 extends from the piston head 62 through the opening 66 and out of the cylinder 56. A seal 70 is provided at the opening 66 to seal the opening 66 around the piston rod 58 and to seal the opening 66 adjacent the cylinder 56. In this manner, the piston 54 is disposed for reciprocating movement into and out of the cylinder 56, while the piston head 62 slides within the cylinder 56.

The piston 54, more specifically the piston head 62, separates the hydraulic cylinder 56 into two chambers 72, and 74. As the piston 54 slides into and out of the cylinder 56, the piston head 62 slides along the inside of the cylinder 56 and changes the volume of each chamber 72, and 74.

The cylinder 56 contains a liquid 76, such as hydraulic oil. The cylinder 56 may also be filled with a gas, including air. The cylinder 56 may be about ¾ full of oil 76 with air occupying the upper portion of the cylinder 56. As described in greater detail below, the piston head 62 permits the hydraulic oil 76 to freely flow through the piston head 62 when the piston 54 slides in a first direction. The first direction is the direction of the piston 54 sliding out of the cylinder 56. Conversely, the piston head 62 inhibits the hydraulic oil 76 from flowing through the piston head 62 when the piston 54 slides in a second direction. The second direction is the direction of the piston 54 sliding into the cylinder 56, which is opposite to the first direction.

FIG. 3 shows an enlarged view of a portion of FIG. 2 showing the piston head 62 of the anti-buck device 12. The piston head 62 defines two passageways 78, and 80 through the piston head 62. The passageway 78 permits free flow of the hydraulic oil 76 through the piston head 62 from chamber 72 to chamber 74; while, preventing hydraulic oil 76 from flowing through the piston head 62 from chamber 74 to chamber 72. The passageway 80 restricts the flow of hydraulic oil 76 through the piston head 62 from chamber 72 to chamber 74 and from chamber 74 to chamber 72.

The passageway 78 may utilize a one-way valve or a flapper valve 82, for example, to permit oil flow in one direction through the passageway 78 while preventing hydraulic oil flow in another direction through the passageway 78. The direction of the hydraulic oil flow is opposite to the direction of movement of the piston 54. For example, as the piston 54 slides out of the cylinder 56 in one direction, the hydraulic oil 76 flows through the passageway 78 in an opposite direction. The flapper valve 82 opens when the piston 54 is being extended out of the cylinder 56 allowing free flow of hydraulic oil 76 from the chamber 72 through the passageway 78 to the chamber 74. There is no resistance to the extension of the piston 54 because the hydraulic oil 76 flows freely through the passageway 78. Conversely, the flapper valve 82 closes when the piston 54 is being inserted into the cylinder 56 preventing hydraulic oil 76 from flowing through the passageway 78. One such passageway 78 has a uniform circular cross-section and has a relatively straight central axis.

The passageway 80 restricts hydraulic oil flow through the piston head 62 in both a first direction and a second direction. Again, the direction of the hydraulic oil flow is opposite to the direction of the movement of the piston 54. The passageway 80 may restrict oil flow by having a cross-sectional area of sufficiently small size to prevent hydraulic oil 76 from flowing freely through the passageway 80, for example. When the piston 54 is being extended out of the cylinder 56 the passageway 80 permits restricted oil flow from the chamber 72 to the chamber 74. However, a majority of the hydraulic oil 76 will flow through the unrestricted passageway 78. When the piston 54 is being inserted into the cylinder 56 the flapper valve 82 closes the unrestricted passageway 78 and forces the hydraulic oil 76 to flow through the restricted passageway 80 at a relatively low flow rate. Relatively sudden or forceful motions to slide the piston 54 into the cylinder 56 will be resisted by restricting oil flow through the restricted passageway 80. However, relatively slower, less forceful motions to slide the piston 54 into the cylinder 56 will be accommodated by the metering of the oil 76 through the restricted passageway 80. One such restricted passageway 80 has a uniform circular cross-section and has a relatively straight central axis. The cross-sectional area of the restricted passageway 80 is smaller than the cross-sectional area of the unrestricted passageway 78.

FIG. 4 shows a hydraulic cylinder assembly 52 having a single passageway 80a for metering the flow of hydraulic fluid and is described in more detail below. The passageway 80a may be constructed in many different forms as long as the passageway 80a meters the flow of the hydraulic oil 76. For example, the passageway 80a, and also the passageways 78 and 80, may have a uniform cross-sectional diameter, may have a narrowed cross-sectional diameter in a localized area, may include a flow restriction device such as a two way valve, or may form a non-linear flow path. In all other respects, this embodiment operates as described in regards to the two passageway embodiment. Of course it would be possible to replace the single passageway 80a or double passageways 80 and 78 with numerous passageways.

Referring to FIG. 1, in operation of the present invention, an anti-buck device 12, such as the hydraulic cylinder assembly 52, is mounted between the engine chassis 18 and the cutting deck 16 of the out-front mower tractor 10. The piston 54 is partially inserted into the cylinder 56 such that the piston head 62 separates the cylinder 56 into two chambers 72, 74 containing hydraulic oil 76. An operator is seated in the operator's seat 38 of the out-front mower tractor 10. The out-front mower tractor 10 may be stationary or it may be traveling forward while pushing the cutting deck 16.

When the operator places the out-front mower tractor 10 in reverse the main drive wheels 24 will engage the ground 30 and force the out-front mower tractor 10 into the reverse direction. The rear end 36 of the out-front mower tractor 10 will attempt to buck up off of the ground 30 and rotate about the drive wheel axles 26 toward the cutting deck 16. The operator may be thrust forward and potentially even dislodged from the operator's seat 38. Bucking may occur when the operator places the out-front mower tractor 10 in reverse either from a stationary position or while the out-front mower tractor 10 is moving forward. Bucking is particularly severe when the out-front mower tractor 10 is suddenly put into reverse.

However, the hydraulic cylinder assemblies 52 of the present invention will reduce or eliminate the rear end 36 from bucking up. Referring to FIGS. 1–4, as the rear end 36 attempts to buck up, the piston 54 will be suddenly and forcefully moved into the cylinder 56.

In the embodiment shown in FIGS. 2 and 3, the flapper valve 82 will close off the passageway 78 to force all oil flow through the restricted passageway 80. Because the hydraulic oil 76 is significantly restricted from flowing through the passageway 80, the piston 54 is held in a stationary position and prevented from sliding into the cylinder 56. In this manner, the hydraulic cylinder assembly 52 functions as a solid, structural member. Accordingly, the hydraulic cylinder assembly 52 prevents the rear end 36 of the out-front mower tractor 10 from bucking up.

In the single passageway embodiment, shown in FIG. 4, passageway 80a meters the flow of fluid to prevent sudden flow of fluid from the chamber 74 to the chamber 72. Because the hydraulic oil 76 is significantly metered or restricted from flowing through the passageway 80a, the piston 54 is held in a substantially stationary position and prevented from abruptly sliding into the cylinder 56. In this manner, the hydraulic cylinder assembly 52 functions as a solid, structural member. Accordingly, the hydraulic cylinder assembly 52 prevents the rear end 36 of the out-front mower tractor 10 from bucking up. The passageway 80a only allows for slow rates of fluid flow in either direction through the piston head 62 so that the mower may follow the terrain while mowing and while preventing bucking.

While the out-front mower tractor 10 is traveling forward or reverse, the ground terrain 30 may change such that the cutting deck 16 may move upward or downward. The anti-buck device 12 of the present invention provides free downward movement of the cutting deck 16. As the cutting deck 16 moves downward, the piston 54 extends outward from the cylinder 56. The piston head 62 will slide within the cylinder 56 to enlarge the volume of the chamber 74 and decrease the volume of the chamber 72. Referring to the two passageway embodiment shown in FIG. 3, the hydraulic oil 76 will flow freely and unrestricted from the chamber 72 through the passageways 78, 80 to the chamber 74.

Referring to the single passageway embodiment shown in FIG. 4, the passageway 80a will meter the flow of hydraulic oil 76 from the chamber 72 to the chamber 74 as the piston 54 slides out of the cylinder 56. However, there is less resistance to the extension of the piston 54 as compared to the resistance encountered when the piston 54 is compressed. The hydraulic oil 76 will flow from the chamber 72 through the passageway 80a to the chamber 74. Additionally, the piston 54 encounters a lower resistance during extension because gas is contained in the chamber 72. The gas in chamber 72 compresses more easily than the oil 76 and thus presents a lower resistance to piston movement. Also, a vacuum may be created in chamber 74 which allows the hydraulic oil 76 to flow into the chamber 74 with less restriction. As the piston 54 extends outwardly, the piston head 62 may contact the gas in the chamber 72 causing cavitation. Cavitation occurs when the passageway 80a contacts the gas and the gas flows freely, unrestricted through the piston head 62. In this manner, the anti-buck device 12 allows for slow movement of the piston 54 so that the cutting deck 16 may follow the terrain while resisting the sudden movement of the piston 54 that accompanies bucking.

The anti-buck device 12 of the present invention provides for relatively slow upward movement of the cutting deck 16. As the cutting deck 16 moves relatively slowly upward, the piston 54 moves into the cylinder 56 with relatively little force. The piston head 62 will slide within the cylinder 56 to enlarge the volume of the chamber 72 and decrease the volume of the chamber 74. The hydraulic oil 76 will flow freely through the restricted passageway 80 because the volume of oil flow is low due to the lack of sudden compressive force on the hydraulic cylinder assembly 52. Accordingly the hydraulic oil 76 will flow from the chamber 74 through the passageway 80 to the chamber 72 without significant resistance to the upward movement of the cutting deck 16.

While the preferred embodiments have been illustrated and described, numerous changes and modifications can be made without significantly departing from the spirit and scope of this invention. Therefore, the inventors intend that such changes and modifications be covered by the appended claims.

What is claimed is:

1. An anti-buck vehicle comprising:

an engine chassis having a front end and a rear end;

an implement pivotally connected to the front end of the chassis; and, means connected to the engine chassis and to the implement for resisting pivotal movement of the rear end of the chassis toward the implement by a first amount of resistance, the means for resisting movement allowing the implement to pivot away from the engine chassis under a second amount of resistance which is less than the first amount of resistance, wherein the first amount of resistance is dependent on a relative speed of movement of the rear end of the chassis toward the implement.

2. The anti-buck vehicle of claim 1 wherein the means for resisting pivotal movement comprises:

a cylinder having an opening and containing a fluid; and, a piston having a piston rod slidable into and out of the cylinder through the opening, the piston rod connected to a piston head slidably positioned within the cylinder, the piston head separating the cylinder into a first chamber and a second chamber;

means on the piston head for allowing the fluid to flow through the piston head and between the first and second chambers as the piston head slides within the cylinder.

3. The anti-buck device of claim 2 wherein the fluid flow means comprises:

a first passageway through the piston head to provide an oil passageway from the first chamber to the second chamber and to prevent oil flow from the second chamber to the first chamber, a second passageway through the piston head to permit restricted oil flow between the first and second chambers.

4. The anti-buck vehicle of claim 2 wherein the piston is connected to the engine chassis and the cylinder is connected to the implement.

5. The anti-buck vehicle of claim 1 wherein the means for resisting pivotal movement comprises a self-contained hydraulic cylinder assembly.

6. The anti-buck vehicle of claim 1 wherein the means for resisting pivotal movement comprises:

a first chamber adjacent a second chamber and in fluid communication with the second chamber;

a wall separating the first and second chambers, the wall alternately slidably movable into the first chamber and the second chamber in response to pivotal movement between the engine chassis and the implement; and, a fluid which flows reciprocatingly between the first chamber and the second chamber in response to reciprocating movement of the wall.

7. The anti-buck vehicle of claim 1 wherein the implement is a mower.

8. An out-front mower tractor comprising:

a tractor having a pair of drive wheels positioned at a front tractor end and a first pair of casters positioned at a rear tractor end;

a cutting deck movably connected to the front tractor end, the cutting deck having a second pair of casters;

a hydraulic cylinder assembly connected to the tractor and to the cutting deck; and, means associated with the hydraulic cylinder assembly for preventing sudden compression of the hydraulic cylinder assembly by a compression resistance and for permitting extension of the hydraulic cylinder assembly by an extension resistance which is less than the compression resistance, wherein the compression resistance is dependent on a relative speed of movement of the tractor and the cutting deck toward each other.

9. An out-front mower tractor comprising:

a tractor having a pair of drive wheels positioned at a front tractor end and a first pair of casters positioned at a rear tractor end;

a cutting deck movably connected to the front tractor end, the cutting deck having a second pair of casters;

a hydraulic cylinder assembly connected to the tractor and to the cutting deck; and, means associated with the hydraulic cylinder assembly for preventing compression of the hydraulic cylinder assembly when the tractor is placed in reverse and for permitting extension of the hydraulic cylinder assembly, the means providing a lower resistance to extension of the hydraulic cylinder assembly than a resistance to compression of the hydraulic cylinder assembly, wherein the resistance to compression is dependent on a relative speed of movement between the tractor and the cutting deck.

10. A vehicle comprising:

a first frame having a pair of front wheels and a pair of rear wheels, the first frame having a first frame front end and a first frame rear end;

a second frame having a second frame front end and a second frame rear end, the second frame rear end pivotally connected to and supported by the first frame front end; and, means associated with the first and second frames for resisting pivotal movement of the first frame rear end upward and towards the second frame, the means permitting pivotal movement of the second frame front end downward and away from the first frame, the means providing a greater resistance to upward pivotal movement of the first frame rear end than to downward pivotal movement of the second frame front end, wherein the resistance to upward pivotal movement of the first frame rear end is dependent on a relative speed of movement of the first frame rear end toward the second frame.

11. An anti-buck vehicle comprising:

an engine chassis having a front end;

an implement pivotally connected to the front end of the chassis; and, an anti-buck device connected to the engine chassis and to the implement, the anti-buck device restricting pivotal movement of the engine chassis and the implement toward each other, and allowing relatively unrestricted pivotal movement of the engine chassis and the implement away from each other as compared to the restricted movement of the engine chassis and the implement toward each other; wherein the restricted movement of the engine chassis and the implement toward each other is dependent on a relative speed of movement of the engine chassis and the implement toward each other.

12. A method of preventing a vehicle from bucking comprising the steps of:

providing an engine chassis having a front end and a rear end and having the front end of the chassis pivotally connected to an implement;

engaging the vehicle into a reverse direction;

forcing the rear end of the engine chassis pivotally upward and toward the implement; and, selectively preventing the rear end of the engine chassis from pivoting toward the implement by providing a first pivoting resistance in response to a relative speed of the rear end of the engine chassis pivoting upward and permitting the rear end of the engine chassis to freely pivot away from the implement by providing a second pivoting resistance that is less than the first pivoting resistance.

13. The method of preventing a vehicle from bucking of claim 12 wherein the selectively preventing step further comprises the steps of:

providing a hydraulic cylinder assembly connecting the engine chassis to the implement;

applying a compressive force to the hydraulic cylinder assembly when the rear end of the engine chassis is forced upward;

preventing compression of the hydraulic cylinder assembly; and extending the hydraulic cylinder assembly when the rear end of the engine chassis pivots away from the implement.

14. The method of preventing a vehicle from bucking of claim 13 wherein the step of preventing compression further comprises the steps of:

providing a piston head in the cylinder; and restricting oil flow through the piston head.

15. The method of preventing a vehicle from bucking of claim 13 wherein the step of extending the hydraulic cylinder assembly further comprises the step of flowing oil through the piston head unrestricted.

16. The anti-buck device of claim 2 wherein the fluid flow means comprises at least one passageway which meters the flow of oil through the piston head in either direction between the first and second chambers.

* * * * *